United States Patent
Yamada et al.

(10) Patent No.: US 7,633,208 B2
(45) Date of Patent: Dec. 15, 2009

(54) DRIVING DEVICE CAPABLE OF TRANSFERRING VIBRATIONS GENERATED BY AN ELECTRO-MECHANICAL TRANSDUCER TO A VIBRATION FRICTION PORTION WITH A HIGH DEGREE OF EFFICIENCY

(75) Inventors: Tsukasa Yamada, Kanagawa (JP);
Takahiko Nishiyama, Kanagawa (JP);
Soumei Takahashi, Tokyo (JP); Toyoki Tanaka, Kanagawa (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 9 days.

(21) Appl. No.: 12/082,948

(22) Filed: Apr. 15, 2008

(65) Prior Publication Data
US 2008/0297004 A1    Dec. 4, 2008

(51) Int. Cl.
*H01L 41/08* (2006.01)
*H02N 2/00* (2006.01)

(52) U.S. Cl. .................. 310/323.15; 310/12
(58) Field of Classification Search .......... 310/12, 310/323.01, 323.02, 323.08, 323.09, 323.15, 310/323.16, 323.17, 328
See application file for complete search history.

(56) References Cited

U.S. PATENT DOCUMENTS

| | | | | |
|---|---|---|---|---|
| 4,786,836 | A * | 11/1988 | Tokushima | ............ 310/323.07 |
| 5,225,941 | A | 7/1993 | Saito et al. | |
| 5,589,723 | A | 12/1996 | Yoshida et al. | |
| 5,890,391 | A | 4/1999 | Okada | |
| 6,111,336 | A * | 8/2000 | Yoshida et al. | .............. 310/328 |
| 6,114,799 | A | 9/2000 | Yoshida et al. | |
| 6,188,161 | B1 * | 2/2001 | Yoshida et al. | .............. 310/328 |
| 7,342,347 | B2 * | 3/2008 | Magnussen et al. | ..... 310/323.01 |
| 2002/0038988 | A1 * | 4/2002 | Matsuo et al. | ......... 310/323.16 |
| 2002/0109434 | A1 * | 8/2002 | Seki | ........................... 310/321 |

(Continued)

FOREIGN PATENT DOCUMENTS

EP        1 605 290 A2     12/2005

(Continued)

OTHER PUBLICATIONS

U.S. Appl. No. 12/082,939, filed Apr. 15, 2008, Entitled "Driving Device Capable of Obtaining a Stable Frequency Characteristic" Inventor: Takahashi et al.

(Continued)

*Primary Examiner*—Thomas M Dougherty
(74) *Attorney, Agent, or Firm*—Frishauf, Holtz, Goodman & Chick, P.C.

(57) ABSTRACT

A driving device includes an electro-mechanical transducer having first and second end portions opposite to each other in an expansion/contraction direction, a stationary member coupled to the first end portion of the electro-mechanical transducer, a vibration friction portion coupled to the second end portion of the electro-mechanical transducer, and a rod-shaped moving portion frictionally coupled to the vibration friction portion, whereby moving the moving portion in the expansion/contraction direction of the electro-mechanical transducer. The vibration friction portion is made of a material having a vibration transfer rate of 4900 meters/second or more. The moving portion is made of a material which has a vibration transfer rate of 4900 meters/second or more and which is different from that of the vibration friction portion.

6 Claims, 8 Drawing Sheets

U.S. PATENT DOCUMENTS

| | | | |
|---|---|---|---|
| 2005/0127789 A1* | 6/2005 | Magnussen et al. | ......... 310/328 |
| 2005/0275315 A1 | 12/2005 | Manabe et al. | |
| 2007/0036533 A1 | 2/2007 | Sasaki | |

FOREIGN PATENT DOCUMENTS

| | | | |
|---|---|---|---|
| EP | 1 755 176 A2 | | 2/2007 |
| JP | 6-174999 A | | 6/1994 |
| JP | 7-49442 A | | 2/1995 |
| JP | 2633066 | B2 | 4/1997 |
| JP | 9-191665 A | | 7/1997 |
| JP | 10-337057 A | | 12/1998 |
| JP | 3002890 | B2 | 11/1999 |
| JP | 3141714 | B2 | 12/2000 |
| JP | 3171000 | B2 | 3/2001 |
| JP | 3180557 | B2 | 4/2001 |
| JP | 3212225 | B2 | 7/2001 |
| JP | 3218851 | B2 | 8/2001 |
| JP | 2003-185406 A | | 7/2003 |
| JP | 2005-218244 A | | 8/2005 |
| JP | 2006-5998 A | | 1/2006 |
| JP | 2006-54979 A | | 2/2006 |
| JP | 2006-113155 A | | 4/2006 |
| JP | 2006-113874 A | | 4/2006 |
| JP | 2006-304529 A | | 11/2006 |

OTHER PUBLICATIONS

U.S. Appl. No. 12/082,947, filed Apr. 15, 2008, Entitled "Driving Device Capable of Improving a Shock and Vibration Resistance Thereof" Inventor: Nishiyama et al.

U.S. Appl. No. 12/148,252, filed Apr. 17, 2008, Entitled "Driving Device Having Suitable Stationary Member as Material" Inventor: Yamada et al.

U.S. Appl. No. 12/148,253, filed Apr. 17, 2008, Entitled "Method of Driving a Driving Device" Inventor: Tanaka et al.

U.S. Appl. No. 12/148,257, filed Apr. 17, 2008, Entitled "Driving Device Capable of Reducing Height Thereof" Inventor: Yamada et al.

U.S. Appl. No. 12/148,793, filed Apr. 22, 2008, Entitled "Position Detecting Device Capable of Improving Detection Accuracy" Inventor: Tanaka et al.

Extended European Search Report dated Sep. 9, 2008 issued in European Application No. 08154985.9-2213 (which is a counterpart of related U.S. Appl. No. 12/148,793).

Extended European Search Report dated Sep. 1, 2009 (8 pages), issued in counterpart European Application Serial No. 08154734.1.

* cited by examiner

DRIVING DEVICE CAPABLE OF TRANSFERRING VIBRATIONS GENERATED BY AN ELECTRO-MECHANICAL TRANSDUCER TO A VIBRATION FRICTION PORTION WITH A HIGH DEGREE OF EFFICIENCY

This application is based upon and claims the benefit of priority from Japanese Patent Application JP 2007-107785, filed on Apr. 17, 2007, the disclosure of which is incorporated herein in its entirety by reference.

BACKGROUND OF THE INVENTION

This invention relates to a driving device (a linear actuator) and, in; particular, to a driving device where an electro-mechanical transducer such a piezoelectric element is used as a driving source of the driving device (the linear actuator).

Previously, linear actuators (driving devices) using electromechanical transducers such as piezoelectric elements, electrostrictive elements, magnetostrictive elements, or the like are used as auto-focus actuators or zoom actuators for use in cameras.

By way of illustration, Japanese Patent No. 2633066 (JP-B 2633066) (which will be also called a first patent document), which corresponds to U.S. Pat. No. 5,225,941, discloses a driving device comprising a driving rod frictionally engaged with a lens barrel, a piezoelectric element disposed in contact with the driving rod, and a leaf spring for bringing the driving rod into frictional engagement with the lens barrel. That is, the driving rod is bonded to an end of the piezoelectric element in an expansion direction. The lens barrel is movably supported to the driving rod. The leaf spring produces friction between the driving rod and the lens barrel. In the driving device disclosed in JP-B 2633066, a voltage is applied to the piezoelectric element so as to make a speed of expansion of the piezoelectric element different from a speed of contraction thereof.

In addition, Japanese Patent No. 3218851 (JP-B 3218851) (which will be also called a second patent document), which corresponds to U.S. Pat. No. 5,589,723, discloses a driving apparatus comprising a piezoelectric element, a driving member (a driving shaft), coupled to the piezoelectric element, for extending in an expansion direction of the piezoelectric element, and a driven member (a moving member, a lens barrel) having a friction member frictionally coupled to the driving member (the driving shaft). The driving apparatus in JP-B 3218851 drives the lens barrel by devising a driving signal applied to the piezoelectric element. Japanese Patent No. 3180557 (JP-B 3180557) (which will be also called a third patent document), which corresponds also to U.S. Pat. No. 5,589,723, discloses a driving apparatus including the friction member composed of a metal and the driving member made of a fiber-reinforced resin composite.

Japanese Unexamined Patent Application Publication No. 2006-54979 (JP-A 2006-54979) (which will be also called a fourth patent document) discloses an actuator which is capable of moving a driven member with stability and with precision. The actuator disclosed in JP-A 2006-54979 comprises a first piezoelectric element, a diving member mounted to the first piezoelectric element, a driven member which is frictionally coupled to the driving member and which extends in a driving direction, and a second piezoelectric element for engaging the driving member with the driven member and for releasing a friction engagement between the driving member and the driven member. Specifically, the actuator disclosed in JP-A 2006-54979 comprises a pair of first piezoelectric elements for driving, a second piezoelectric element for engagement, a pair of driving members, and a pressure spring. The pair of first piezoelectric elements and the pair of driving members are disposed at both sides with the driven member sandwiched between them. The pair of driving members have a distance which is expanded or narrowed by the second piezoelectric element. By the second piezoelectric element, the friction engagement between the pair of the driving members and the driven member is ensured or released.

Japanese Unexamined Patent Application Publication No. H9-191665 (JP-A 9-191665) (which will be also called a fifth patent document), which corresponds to U.S. Pat. No. 5,890,391, discloses a linear drive mechanism using an electromechanical conversion element which is insensitive to elastic deformation of a constituent member. The linear driving mechanism disclosed in JP-A 9-191665 comprises the electromechanical conversion element, a working member which is fixedly connected to the electromechanical conversion element and which displaces with the electromechanical conversion element, a driving member frictionally coupled to the working member, a driven member coupled to the driving member, and a driving pulse generating arrangement for causing expansion/contraction displacement to the electromechanical conversion element.

Japanese Unexamined Patent Application Publication No. 2006-5998 (JP-A 2006-5998) (which will be also called a sixth patent document) discloses a liner actuator in which optimum surface roughness is specifically defined in a contact state of a frictionally coupled portion between a transfer member (a vibration friction portion) for transferring vibration of a piezoelectric element and a moving member (a moving portion) which is frictionally coupled to the transfer member (the vibration friction portion). In JP-A 2006-5998, a rod made of carbon is used as the transfer member and a combination of a metal slider and a cap which sandwich the rod is used as the moving member.

Japanese Unexamined Patent Application Publication No. H10-337057 (JP-A 10-337057) (which will be also called a seventh patent document), which corresponds to U.S. Pat. No. 6,188,161, discloses a driving apparatus capable of high speed driving in a high frequency range. In the driving apparatus disclosed in JP-A 10-337057, a movable member is movably supported by a fixed shaft (a driving shaft). Aligned in the direction of the fixed shaft, a piezoelectric element has one expansion end which is connected to one end of the movable member. The piezoelectric element has another expansion end which is connected to a driving friction member. The driving friction member comprises a main body that is connected to the piezoelectric element and a pair of semi-cylindrical protrusions that protrude toward the fixed shaft from a side of the main body. The pair of protrusions elastically grasp the fixed shaft from both above and below, and are in friction contact with the fixed shaft. The driving friction member is made lightweight, highly elastic, highly movable and very hard by using an aluminum alloy treated with anode oxide coating. JP-A 10-337057 neither discloses nor teaches a material of the fixed shaft (the driving shaft).

Japanese Unexamined Patent Application Publication No. H7-49442 (JP-A 7-49442) (which will be also called an eighth patent document) discloses a driving device comprising a driving member vibrating in an axial direction and a driven member making friction contact with the driving member. In the driving device disclosed in JP-A 7-49442, the driving member and the driven member are formed from frictional anisotropic materials in which the frictional coefficient between the driving member and the driven member is differed in positive and reversed vibrating direction of the driving member.

Furthermore, Japanese Patent No. 3171000 (JP-B 3171000) (which will be also called a ninth patent document), which corresponds also to U.S. Pat. No. 5,589,723, discloses a driving apparatus which is capable of realizing high speed movement. The driving apparatus disclosed in JP-B 3171000 comprises a support member (a stationary member), an electro-mechanical transducer, a driving member (a vibration friction portion), a barrel (a moving member), and a friction adding member (a plate spring). The electro-mechanical transducer has an end in an expansion/contraction direction that is fixed to the stationary member. The electro-mechanical transducer is applied with a voltage so that the electro-mechanical transducer expands and contracts at different speeds on expanding and on contracting, respectively. The driving member (the vibration friction portion) is connected to another end of the electro-mechanical transducer and is supported so as to move in the expansion/contraction direction of the electro-mechanical transducer. The moving member is frictionally engaged with the driving member and is supported so as to move in the expansion/contraction direction of the electro-mechanical transducer. The friction adding member provides a friction force between the driving member and the moving member. The driving member and the moving member are set to generate sliding therebetween even when the electro-mechanical transducer is expanded and contacted. However, JP-B 3171000 neither discloses nor teaches specific materials of the driving member (the vibration friction member) and the moving member.

There are problems in the above-mentioned first through forth patent documents as follows.

In the driving device disclosed in the first patent document, inasmuch as the lens holder (the driven member, the moving portion) is movably supported to the guide bar (the driving member, the vibration friction portion) bonded to the piezoelectric element, the guide bar (the driving member, the vibration friction portion) has a length longer than that of the lens holder (the driven member, the moving portion) and the guide bar (the driving member, the vibration portion) is easy to produce an inclination caused by a reciprocating motion. In addition, the longer a moving distance of the lens holder (the driven member, the moving portion), the longer the guide bar (the driving member, the vibration friction member) and it results in easily producing an unnecessary vibration mode. Furthermore, inasmuch as the friction engagement portion lies on an extension of a coupling portion between the piezoelectric element and the guide bar (the driving member, the vibration friction member), it counts against a reduction in profile thereof.

In also the driving apparatus disclosed in the second patent document, inasmuch as the driving shaft (the driving member, the vibration friction portion) extends in an expansion/contraction direction of the electro-mechanical transducer, the driving shaft (the driving member, the vibration friction portion) has a length longer than that of the a zoom lens barrel (the driven member, the moving portion) and the driving shaft (the driving member, the vibration friction portion) is easy to produce an inclination caused by a reciprocating motion. In addition, the longer a moving distance of the zoom lens barrel (the driven member, the moving portion), the longer the driving shaft (the driving member, the vibration friction portion) and it results in easily producing an unnecessary vibration mode. Furthermore, inasmuch as the friction engagement portion lies on an extension of a coupling portion between the electro-mechanical transducer and the driving shaft (the driving member, the vibration friction member), it counts against a reduction in profile thereof. In addition, inasmuch as the driving apparatus has structure where the zoom lens barrel (the driven member, the moving portion) is cantilevered by the driving shaft (the driving member, the vibration friction portion), it is impossible to mechanically move a large weight object such as the lens.

The third patent document may just disclose the driving apparatus where the driving shaft (the driving member, the vibration friction portion) is made of the fiber-reinforced resin composite and has a basic structure which is similar to that illustrated in the second patent document. It has therefore disadvantage which is similar to that of the second patent document.

Although the driving member (the vibration friction portion) has a length which is shorter than that of the driven member (the moving portion) in the actuator disclosed in the fourth patent document, the actuator disclosed in the fourth patent document is disadvantageous in that it is complicated in structure and it is impossible to reduce a size thereof because it comprises a plurality of piezoelectric elements.

On the other hand, the fifth patent document discloses the linear drive mechanism where the moving member (the moving portion) has a rod shape and the working member (a vibration friction portion) has a complicated shape. Incidentally, in order to improve moving efficiency of the moving portion due to vibration displacements of the vibration friction portion that are generated by the electro-mechanical transducer, it is necessary to adjust a coefficient of kinetic friction and a coefficient of static friction between the vibration friction portion and the moving portion to optimum values or conditions. For this purpose, it is necessary to select suitable materials for the vibration friction portion and the moving portion. However, the fifth patent document neither discloses nor teaches the materials of the vibration friction portion and the moving portion.

The sixth patent document defines the surface roughness of the vibration friction portion and the moving portion which are frictionally coupled to each other. However, in the manner which is described above, in order to improve the moving efficiency of the moving portion due to vibration displacements of the vibration friction portion generated by the electro-mechanical transducer, it is necessary to adjust the coefficient of kinetic friction and the coefficient of static friction between the vibration friction portion and the moving portion to optimum values or conditions. The coefficient of kinetic friction and the coefficient of static friction have values which change dependent not only on the surface roughness of the vibration friction portion and the moving portion but also on the hardness and density of materials of both.

Although the seventh patent document may describe the material of the driving friction member, but the seventh patent document neither discloses nor teaches the material of the fixed shaft (the driving shaft). The eighth patent document merely discloses the driving device comprising the driving member and the driven member which are formed from frictional anisotropic materials. The ninth patent document neither discloses nor teaches specific materials of the driving member (the vibration friction member) and the moving member.

At any rate, although it is necessary for the driving device to transfer vibrations generated by the electro-mechanical transducer to the vibration friction portion with a high degree of efficiency, any of the first through the neigh patent documents neither discloses nor teaches the materials of the vibration friction portion and the moving portion which are suitable to realize this.

SUMMARY OF THE INVENTION

It is therefore an exemplary object of the present invention to provide a driving device which is capable of transferring vibrations generated by an electro-mechanical transducer to a vibration friction portion with a high degree of efficiency.

It is another exemplary object of the present invention to provide a driving device which is capable of improving moving efficiency of the moving potion due to vibration displacements of the vibration friction portion that are generated by the electro-mechanical transducer.

Other objects of this invention will become clear as the description proceeds.

On describing the gist of an exemplary aspect of this invention, it is possible to be understood that a driving device includes an electro-mechanical transducer having first and second end portions opposite to each other in an expansion/contraction direction, a static member coupled to the first end portion of the electro-mechanical transducer, a vibration friction portion coupled to the second end portion of the electro-mechanical transducer, and a rod-shaped moving portion frictionally coupled to the vibration friction portion. The rod-shaped moving portion is movable in the expansion/contraction direction of the electro-mechanical transducer. According to the exemplary aspect of this invention, the vibration friction portion is made of a material having a vibration transfer rate of 4900 meters/second or more, and the moving portion is made of a material which has a vibration transfer rate of 4900 meters/second or more and which is different from that of the vibration friction portion.

DESCRIPTION OF THE PREFERRED EMBODIMENTS

Figure 1:
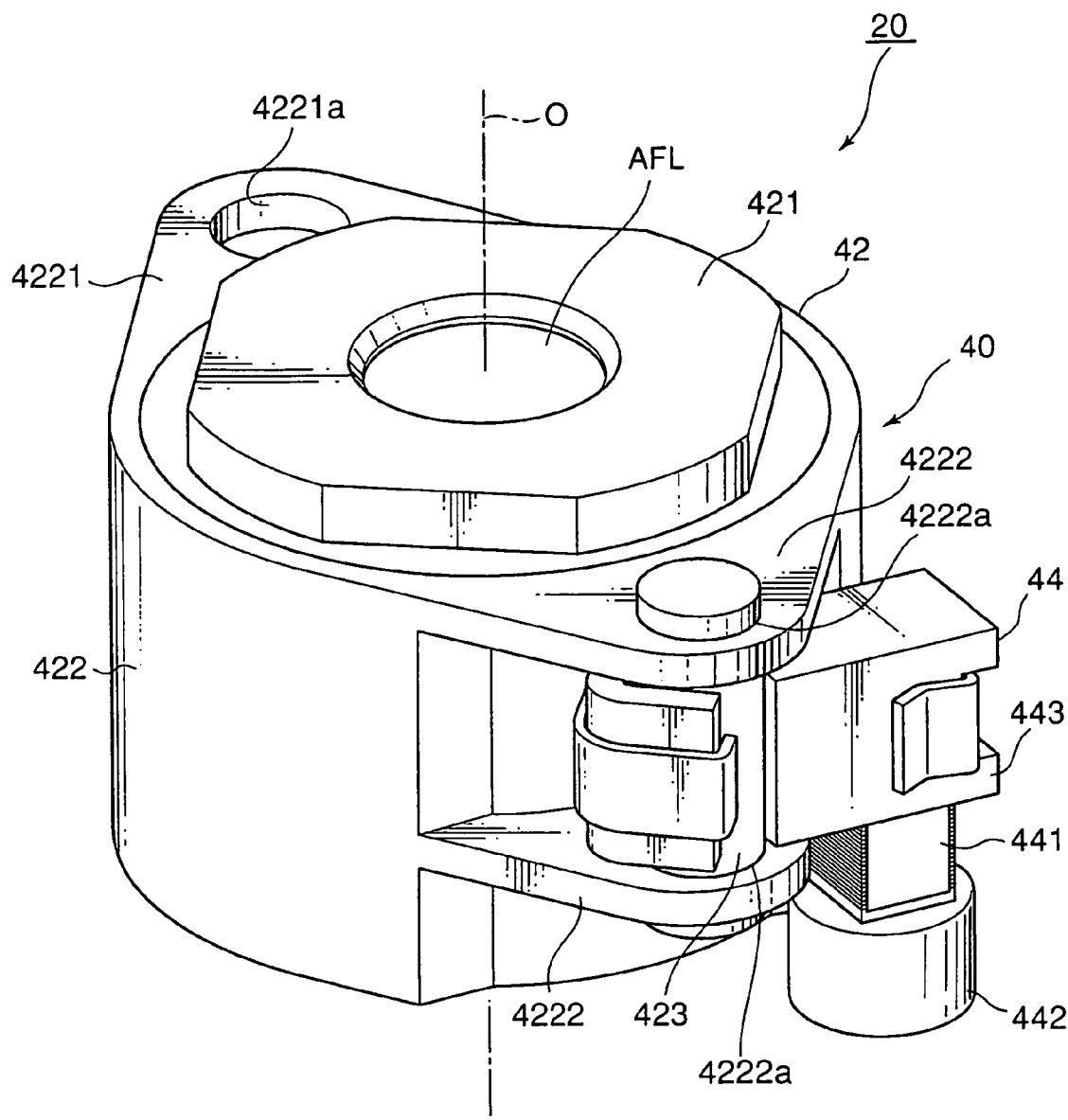
FIG. 1 is an external perspective view showing a driving device according to an exemplary embodiment of this invention.

FIG. 1 is an external perspective view of a driving device 20 according to an exemplary embodiment of this invention.

Herein, in the manner shown in FIG. 1, an orthogonal coordinate system (X, Y, Z) is used. In a state illustrated in FIG. 1, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIG. 1, the up-and-down direction Z is a direction of an optical axis O of a lens.

The driving device 20 is covered with a cabinet (not shown). The cabinet includes a cap-shaped upper cover (not shown) and a lower base (not shown). On the lower base of the cabinet, a stationary member (a weight) 442 which will later be described is mounted. The upper cover has an upper surface comprising a cylinder portion (not shown) having a center axis which is the optical axis O.

On the other hand, although illustration is not made, the lower base had a central portion in which an image pickup device disposed on a substrate is mounted. The image pickup device picks up a subject image formed by an movable lens (which will later be described) to convert it into an electric signal. The image pickup device may, for example, comprise a CCD (charge coupled device) type image sensor, a CMOS (complementary metal oxide semiconductor) type image sensor, or the like.

The illustrated driving device 20 comprises an auto-focus lens driving unit 40.

In the cabinet, a guide shaft (not shown) is disposed at a left and back side. The guide shaft extends in parallel with the optical axis O. The guide shaft has an upper end which is fixed to the upper surface of the upper cover of the cabinet and a lower end which is fixed to the lower base of the cabinet. With the optical axis O sandwiched, a rod-shaped moving portion (a movable shaft) 423, which will later be described, is disposed at a right and front side which is opposite side with respect to the guide shaft. That is, the guide shaft and the moving shaft 423 are disposed at positions which are rotationally symmetric about the optical axis O.

The auto-focus lens driving unit 40 comprises a lens movable portion 42 and a lens driving portion 44. The lens movable portion 42 includes a lens holding frame 421 for holding an auto-focus lens AFL which is the movable lens. The lens holding frame 421 is fixed on an upper portion of a movable barrel 422 having a substantially cylindrical shape. The movable barrel 422 comprises a pair of extending portions (however, an upper side thereof is only illustrated in FIG. 1) 4221 which extend in a radial direction outwards at the left and back side. The pair of extending portions 4221 have through holes 4221a through which the above-mentioned guide shaft passes. In addition, the movable barrel 422 comprises a pair of extending portions 4222 which extend in the radial direction outwards at the right and front side. The pair of extending portions 4222 have fitting holes 4222a through which the rod-shaped movable shaft 423 passes and to which the rod-shaped moving shaft 423 is fixed. With this structure, the lens movable portion 42 is movable in the direction of the optical axis O with respect to the cabinet.

The lens driving portion 44 slidably supports the lens movable portion 42 in the direction of the optical axis O and drives the lens movable portion 42 in the manner which will later be described.

Figure 2:
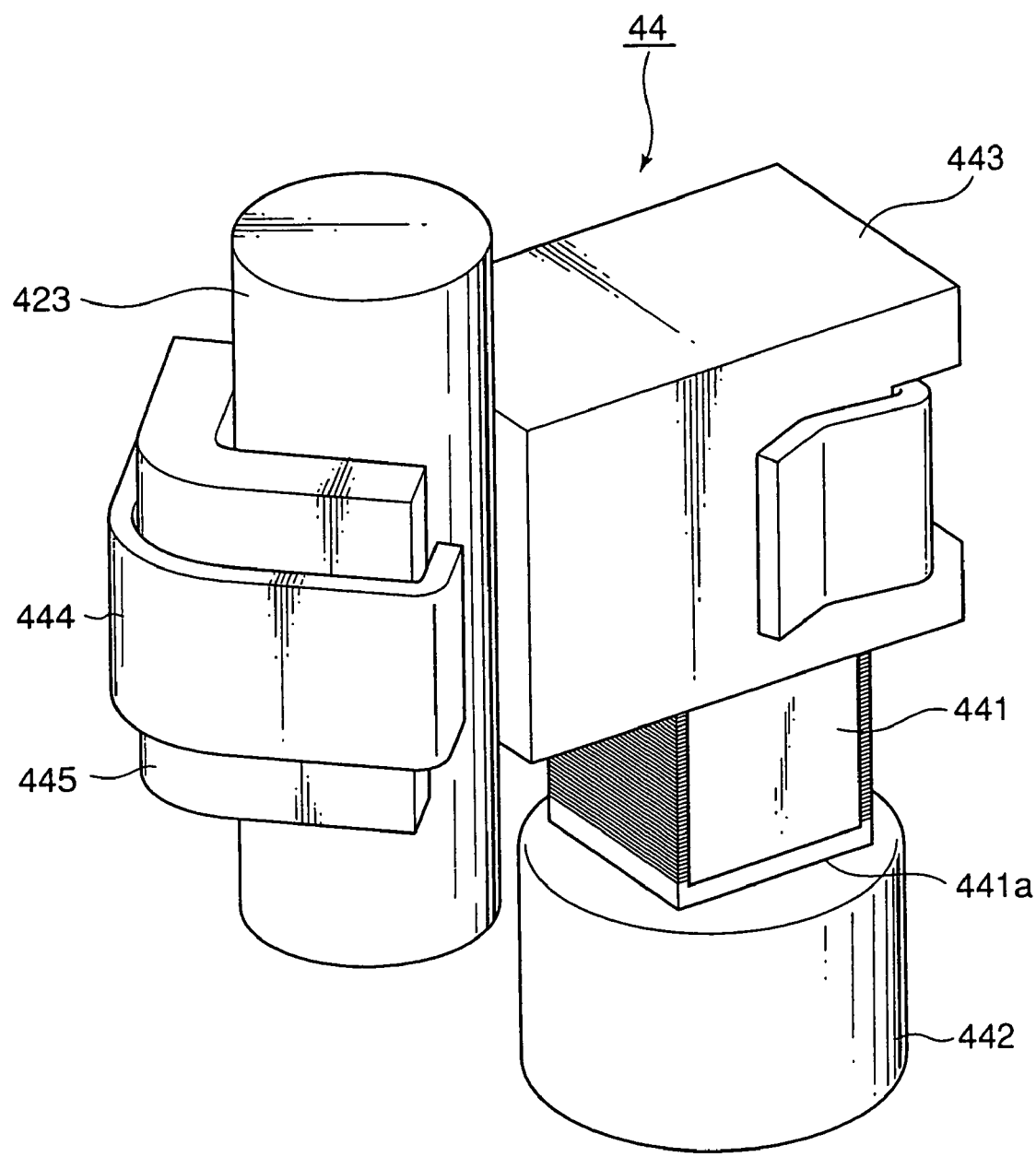
FIG. 2 is a perspective view showing a lens driving portion of the driving device illustrated in FIG. 1 together with a rod-shaped moving shaft.
Figure 3:
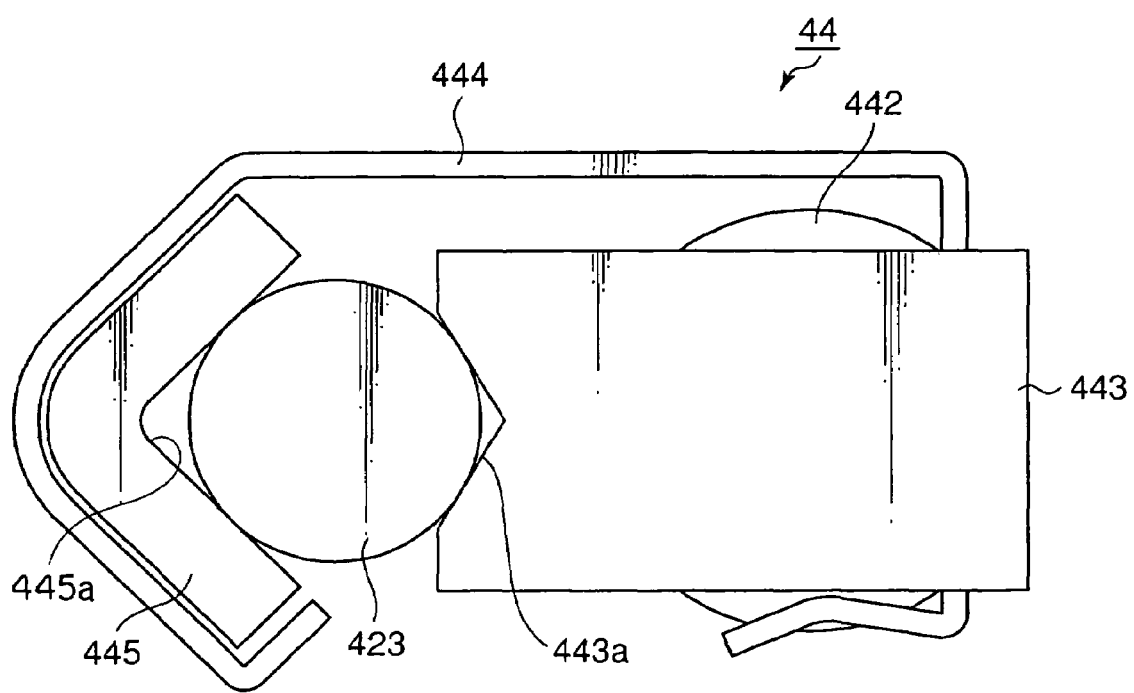
FIG. 3 is a plan view showing the lens driving portion of the driving device illustrated in FIG. 2 together with the rod-shaped moving shaft.
Figure 4:
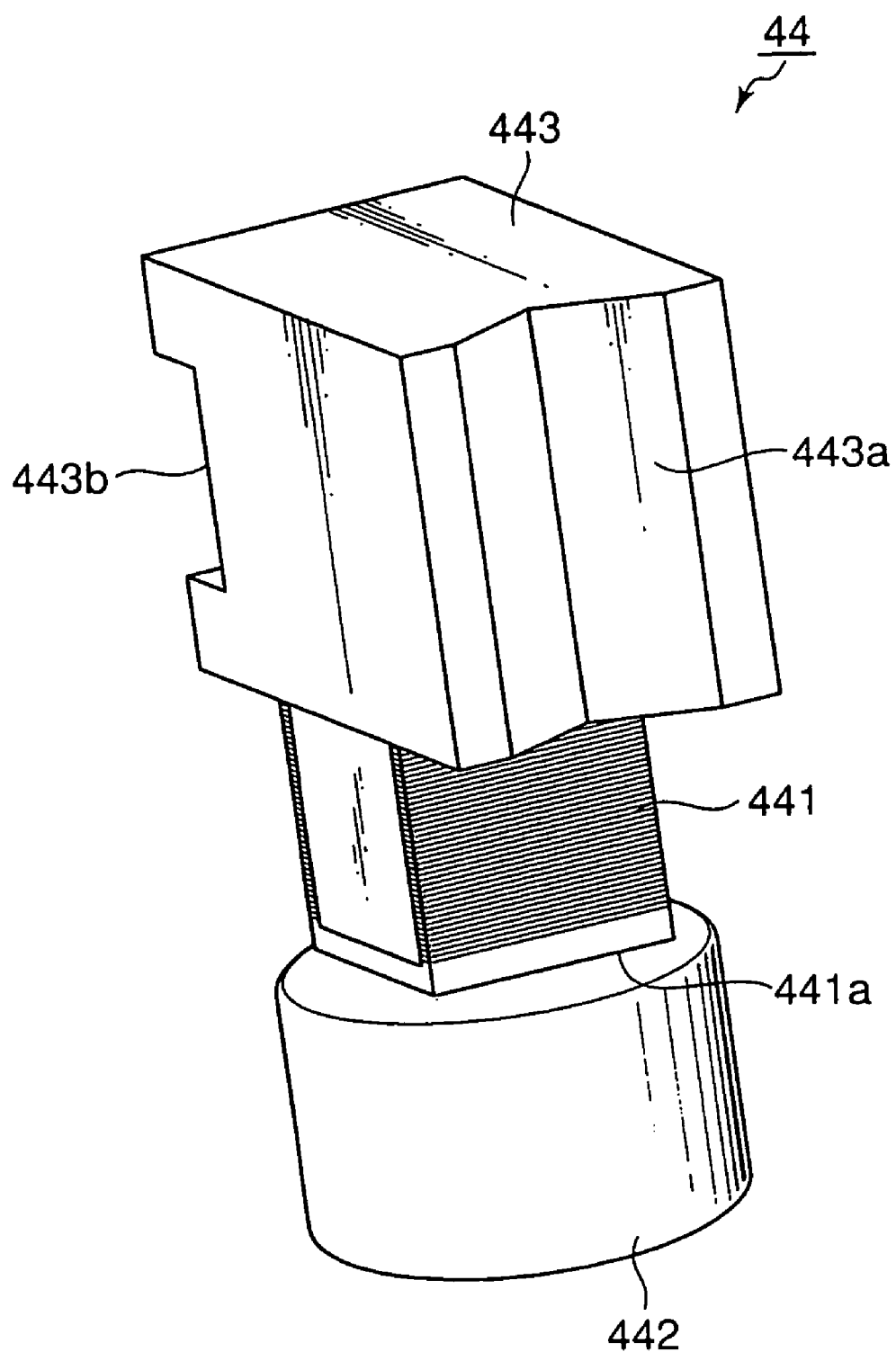
FIG. 4 is a perspective view showing a main portion of the lens driving portion illustrated in FIG. 2.

Referring to FIGS. 2 through 4 in addition to FIG. 1, the description will proceed to the lens driving portion 44 of the auto-focus lens driving unit 40. FIG. 2 is a perspective view showing the lens driving portion 44 of the auto-focus lens driving unit 40 together with the rod-shaped moving shaft 423. FIG. 3 is a plan view showing the lens driving portion 44 of the auto-focus lens driving unit 40 together with the rod-shaped moving shaft 423. FIG. 4 is a perspective view showing a main portion of the lens driving portion 44.

Figure 5:
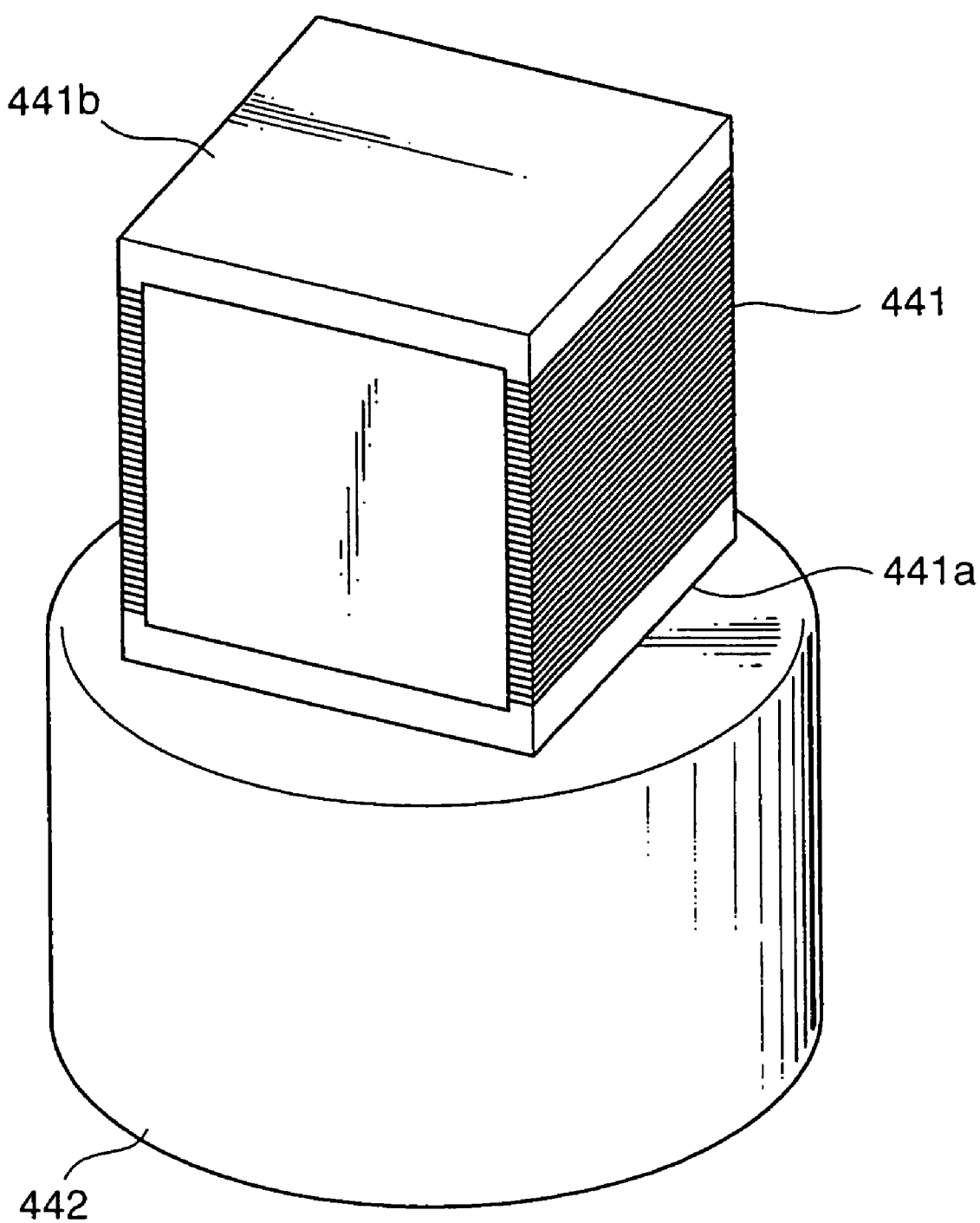
FIG. 5 is a perspective view showing an piezoelectric unit for use in the lens driving portion illustrated in FIG. 2.

The lens driving portion 44 comprises a laminated piezoelectric element 441 serving as an electro-mechanical transducer, the stationary member (the weight) 442, and a vibration friction portion 443. The laminated piezoelectric element 441 expands and contracts in a direction of the optical axis O. The laminated piezoelectric element 441 has a structure where a plurality of piezoelectric layers are laminated in the direction of the optical axis O. As shown in FIG. 5, the laminated piezoelectric element 441 has a first end portion (a lower end portion) 441a and a second end portion (an upper end portion) 441b which are disposed to each other in the expansion/contraction direction. The stationary member (the weight) 442 is coupled to the first end portion (the lower end portion) 441a of the laminated piezoelectric element 441 using an adhesive agent or the like. The vibration friction portion 443 is coupled to the second end portion (the upper end portion) 441b of the laminated piezoelectric element 441 using the adhesive agent or the like.

In addition, as shown in FIG. 5, a combination of the laminated piezoelectric element 441 and the static member 442 is called an piezoelectric unit.

The rod-shaped moving shaft 423 is frictionally coupled to the vibration friction portion 443. As shown in FIGS. 3 and 4, the vibration friction portion 443 has a groove (a friction engagement surface) 443a which is a V-shape in cross section at a friction coupling portion between the vibration friction portion 443 and the rod-shaped moving shaft 423.

The lens driving portion 44 comprises a spring 444 for pressing (urging) the rod-shaped moving shaft 423 against the vibration friction portion 443. That is, the spring 444 serves as an urging arrangement which is fixed to the vibration friction portion 443 and which generates a pressing force for pressing the moving shaft 423. Between the spring 444 and the rod-shaped moving shaft 423, a pad 445 having a V-shaped structure is sandwiched. The pad 445 is disposed so as to be opposed to the vibration friction portion 443 with the moving shaft 423 sandwiched therebetween. In the manner which is similar to the vibration friction portion 443, the pad 445 also has a groove 445a which is a V-shape in cross section at a contact portion between the pad 445 and the rod-shaped moving shaft 423. The vibration friction portion 443 has a groove 443b for holding the spring 444. The spring 444 has a first end portion which is engaged with the vibration friction portion 443 at the groove 443b and a second end portion which extends towards the moving shaft 423. Therefore, the vibration friction portion 443 and the pad 445 are pressed against the rod-shaped moving shaft 423 by the spring 444. As a result, the rod-shaped moving shaft 423 is frictionally coupled to the vibration friction portion 443 with stability.

The lens driving portion 44 and the lens moving portion 42 are disposed in parallel with each other in the optical axis O as shown in FIG. 1. Accordingly, it is possible to lower a height of the auto-focus lens driving unit 40. As a result, it is possible to also lower a height of the driving device 20.

Figures 6A, 6B:
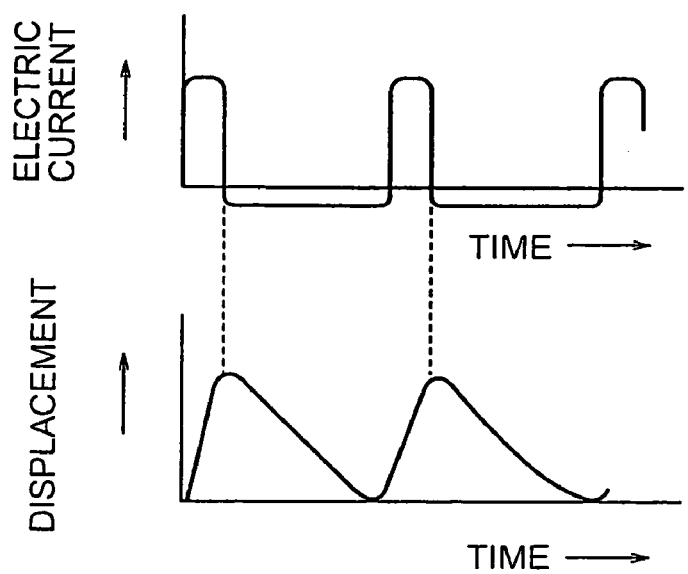
FIG. 6A is a waveform diagram for use in describing a current supplied to a laminated piezoelectric element.
FIG. 6B is a waveform diagram for use in describing displacements generated by the laminated piezoelectric element.

Referring now to FIGS. 6A and 6B, the description will proceed to an electric current supplied to the laminated piezoelectric element 441 and displacements generated in the laminated piezoelectric element 441. FIGS. 6A and 6B are similar to those illustrated in FIG. 5 of the above-mentioned JP-B 3218851 (the second Patent Document) which corresponds to FIGS. 8(a) and 8(b) of U.S. Pat. No. 5,589,723. FIG. 6A shows a change of the electric current supplied to the laminated piezoelectric element 441 by a driving circuit (not shown) and FIG. 6B shows the displacements of the laminated piezoelectric element 441.

As shown in FIG. 6A, a large current (in a positive or forward direction) and a constant current (in a negative or reverse direction) flow alternately through the laminated piezoelectric element 441. Under the circumstances, the laminated piezoelectric element 441 produces alternately a rapid displacement (expansion) corresponding to the large current (positive or forward) and a slow displacement (contraction) corresponding to the constant current (negative or reverse), as shown in FIG. 6B.

That is, by applying a rectangular current to the laminated piezoelectric element 441 (FIG. 6A), it makes the laminated piezoelectric element 441 produce sawtooth displacements (expansion and contraction) (FIG. 6B).

Referring to FIG. 1 in addition to FIGS. 6A and 6B, the description will be made as regards operation of the auto-focus lens driving unit 40. First, the description will presently be made as regards operation in a case where the lens movable portion 42 moves along the up-and-down direction Z downwards.

It will now be assumed that the large current flows to the laminated piezoelectric element 441 in the positive or forward direction as shown in FIG. 6A. In this event, the laminated piezoelectric element 441 rapidly produces the expansion displacement in the thickness direction as shown in FIG. 6B. As a result, the vibration friction portion 443 rapidly moves along the direction of the optical axis O (the up-and-down direction Z) upwards. In this event, the lens movable portion 42 does not move. This is because, caused by the inertial force, the lens movable portion 42 substantially remains in its position by overcoming the friction force between the vibration friction portion 443 and the rod-shaped moving shaft 423.

Subsequently, it will be assumed that the constant current flows the laminated piezoelectric element 441 in the negative or reverse direction as shown in FIG. 6A. In this event, the laminated piezoelectric element 441 slowly produces the contraction displacement in the thickness direction as shown in FIG. 6B. As result, the vibration friction portion 443 slowly moves along the direction of the optical axis O (the up-and-down direction Z) downwards. In this event, the lens movable portion 43 substantially moves along the direction of the optical axis O (the up-and-down direction Z) downwards together with the vibration friction portion 443. This is because the vibration friction portion 443 and the rod-shaped moving portion 423 come into surface contact with each other and are coupled to each other due to the friction force generating in the contact surfaces.

In the manner which is described above, by alternately flowing the large current (the positive or forward direction) and the constant current (the negative or reverse direction) through the laminated piezoelectric element 441 to make the laminated piezoelectric element 441 alternately produce the expansion displacement and the contraction displacement, it is possible to continuously move the lens holder 421 (the lens movable portion 42) along the direction of the optical axis O (the up-and-down direction Z) downwards.

It will be assumed that it makes the lens movable portion 42 along the direction of the optical axis O (the up-and-down direction Z) upwards. Conversely, this is obtained by alternately flowing the large current (the negative or reverse direction) and the constant current (the positive or forward direction) through the laminated piezoelectric element 441.

Now, the description will proceed to the laminated piezoelectric element 441. The laminated piezoelectric element 441 has a rectangular parallelepiped shape having an element size of 0.9 mm×0.9 mm×1.5 mm. The piezoelectric material is made of a material having a low Qm such as lead-zirconate-titanate (PZT). The laminated piezoelectric element 441 is manufactured by alternately laminating the piezoelectric materials each having a thickness of 20 microns and the internal electrodes each having a thickness of 2 microns in a corn fashion by fifty layers. In addition, the laminated piezoelectric element 441 has the effective internal electrode size of 0.6 mm×0.6 mm. In other wards, at a peripheral portion positioned the outside of the effective internal electrode of the laminated piezoelectric element 441, there is a ring-shaped dead area (clearance) of a width of 0.15 mm.

Now, the description will be made as regards materials of the vibration friction portion 443 and the moving portion 423 for use in the driving device 20 according to this invention.

First, the description will proceed to the material of the vibration friction portion 443. As shown in FIG. 4, the vibration friction portion 443 has the friction engagement surface 443a which is a V-shape in cross section and the vibration friction portion 443 has the groove 443b for holding the spring 444. That is, the vibration friction portion 443 has a complicated structure. Accordingly, the illustrated vibration friction portion 443 is made of a material which is enable to be manufactured by one selected from the group of consisting of metal casting, metal forging, and resin molding in consideration of productivity.

In addition, in the driving device 20 using the electro-mechanical transducer (the laminated piezoelectric element) 441, it is necessary to transfer vibrations generated by the electro-mechanical transducer 441 to the vibration friction portion 443 with a high degree of efficiency. In order to realize this, it is necessary to use, as the material of vibration friction portion 443, a material having a high vibration transfer rate. The following Table 1 shows vibration transfer rates of various materials.

TABLE 1

| material's name | aluminum | zinc | magnesium | CFRP | PPS |
|---|---|---|---|---|---|
| vibration transfer rate (m/s) | 5100 | 3700 | 4900 | 8800 | 1400 |

*CFRP: carbon fiber reinforced plastic
*PPS: polyphenylene sulfide plary embodiment of this invention, the vibration friction portion 443 is made of a die casting of aluminum or magnesium. The vibration friction portion 443 may be made by metal forging of a metal sheet of aluminum or magnesium. In addition, the vibration friction portion 443 may be made of the material which has the vibration transfer rate of 4900 meters/second or more and which is enable to be manufactured by one selected from the group of consisting of metal casting, metal forging, and resin molding.

By using such as materials as the vibration friction portion 443, it is possible to transfer the vibrations generated by the electro-mechanical transducer 441 to the vibration friction portion 443 with a high degree of efficiency and it is possible to obtain the vibration friction portion 443 with great productively and at low cost.

In order to optimize a coefficient of friction between the vibration friction portion 443 and a surface of the moving portion 423 with the vibration transfer rate of the vibration friction portion 443 maintained, it is desirable to subject a surface of the vibration friction portion 443 to oxidation layer forming treatment, plating treatment such as nickel, zinc, chromium, or evaporating treatment such nickel, zinc, chromium.

Then, the description will proceed to the material of the moving portion 423. In the manner which is described above, it is necessary to manufacture the vibration friction portion 443 by the die casting of aluminum or the die casting of magnesium because the vibration friction portion 443 has the complicated shape. On the other hand, inasmuch as the driving device 20 has a generation force of about 1 to 2 gf and members such as the movable lens barrel (the lens unit) 422 are mounted on the moving portion 423, it is necessary to save weight of the moving portion 423. In consideration of dimensional accuracy and strength of the structure, it is necessary to select, as the material of the moving portion 423, a material having high Young's modulus. The following Table 2 shows vibration transfer rates [m/s] of materials each of which has a lightweight and high Yang's modulus (i.e. high [Yang's modulus]/[density]$^{1/2}$).

TABLE 2

| material's name | CFRM | CFRP | carbon | Aluminum | magnesium | stainless steel | zinc |
|---|---|---|---|---|---|---|---|
| vibration transfer rate (m/s) | 12000 | 8800 | 8500 | 5100 | 4900 | 4900 | 3700 |

*CFRM: carbon fiber reinforced metal
*CFRP: carbon fiber reinforced plastic

From the Table 1, carbon fiber reinforced plastic (CFRP) has the fastest vibration transfer rate. However, it is very difficult to manufacture the vibration friction portion 443 having the complicated shape as shown in FIG. 4 by the carbon fiber reinforced plastic (CFRP) which is one of fiber-reinforced resin composites. In addition, from the Table 1, among the materials which are enable to be manufactured by one selected from the group of consisting of metal casting, metal forging, and resin molding, aluminum and magnesium have the faster vibration transfer rate. Therefore, in the exem- If two frictionally coupled parts such as the vibration friction portion 443 and the moving portion 423 have equal hardness and equal density, a coefficient of kinetic friction therebetween increases and it is difficult to drive the moving portion 423. Therefore, it is impossible to use, as the material of the moving portion 423, aluminum as used in prior art. Accordingly, the exemplary embodiment of this invention uses, as the material of the moving portion 423, a material other than aluminum and magnesium that has the lightweight and the high Yang's modulus.

From the Table 2, the exemplary embodiment of this invention uses, as the material of the moving portion 423 that satisfies such conditions, a material which is one selected from the group of consisting of a fiber-reinforced resin composite such as the carbon fiber-reinforced plastic (CFRP), a fiber-reinforced metal composite such as carbon-fiber reinforced metal (CFRM), carbon, and stainless steel. In addition, the moving portion 423 may be made of the material which has the vibration transfer rate of 4900 meters/second or more and which is different from that of the vibration friction portion 443.

By using one of such materials as the material of the moving portion 423, by smoothing the frictionally coupled surface, and by adding a suitable constant weight to the moving portion 423 by the spring 444, it is possible to obtain a stable low coefficient of friction.

In the manner which will later be described, it is necessary to smooth the frictionally coupled surface between the moving portion 423 and the vibration friction portion 443 so that a coefficient of kinetic friction therebetween lies in a range between 0.2 ant 0.6, both inclusive, and a ratio of ([a coefficient of static friction]/[a coefficient of kinetic friction]) lies in a range between 1 and 2.5, both inclusive.

As means for smoothing the frictionally coupled surface of the moving portion 423, the following methods may be adopted:

a) making a surface roughness (an arithmetic average roughness) Ra of the moving portion 423 0.8 or less (Ra≦0.8) by means of mechanical working and/or grinding working of the moving portion 423;

b) subjecting a surface of the moving portion 423 to plating treatment such as nickel, zinc, or chromium because the moving portion 423 has conductivity;

c) subjecting a surface of the moving portion 423 to evaporating treatment such as nickel, zinc, or chromium; and d) coating a surface of the moving portion 423 with resin.

Figure 7:
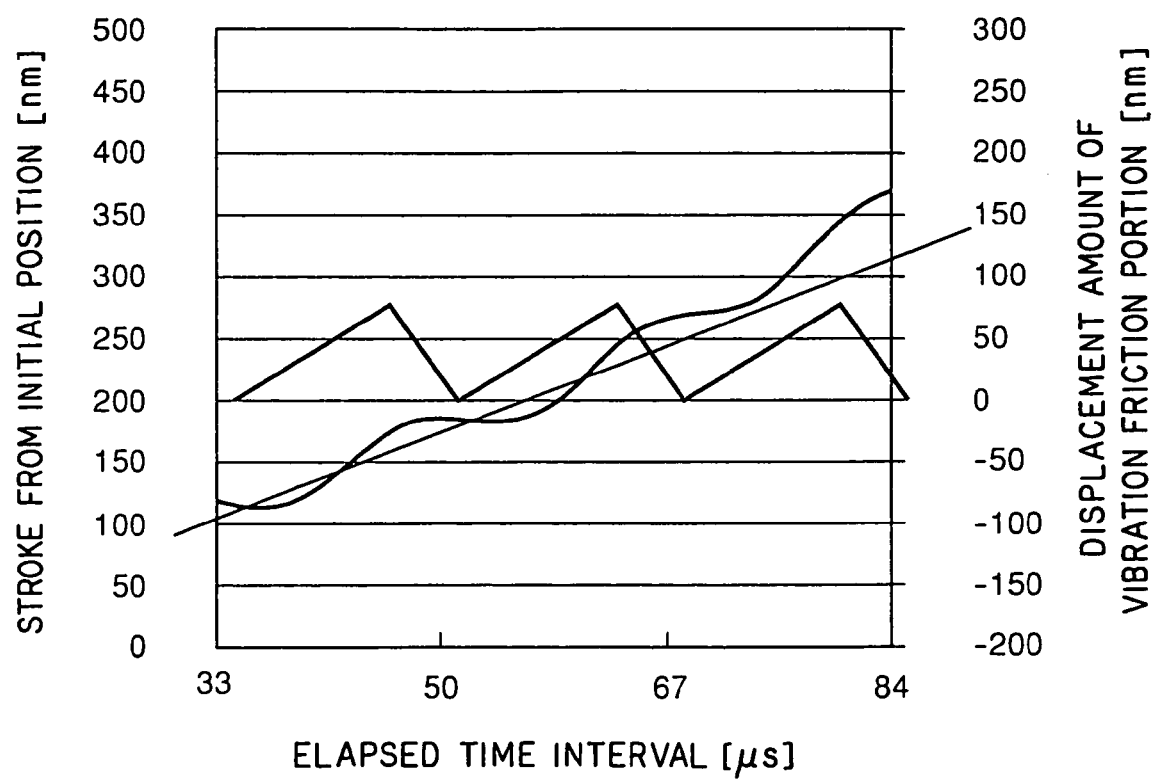
FIG. 7 is a graph for use in describing moving straightness.

Referring now to FIG. 7, the description will proceed to moving straightness. In FIG. 7, the abscissa represents an elapsed time interval [μs], the right axis of the ordinate represents a displacement amount [nm] of the vibration friction portion 443, and the left axis of the ordinate represents a stroke [nm] from an initial position. In FIG. 7, a saw tooth wave represents a displacement waveform of the vibration friction portion 443, a huge wave represents a displacement of the moving portion 423, and a slanting straight line represents an approximate curve of the displacement of the moving portion 423.

When the vibration friction portion 443 undergoes displacement of the saw tooth wave, the displacement of the moving portion 423 becomes wavy as shown in FIG. 7. Under the circumstance, the moving straightness is defined one obtained by converting the variation between a displacement curve of the moving portion 423 and the approximate straight line into numbers.

In the following description, it will be assumed that the fiber-reinforced resin composite is used as the material of the moving portion 423 and aluminum is used as the material of the vibration friction portion 443.

Figure 8:
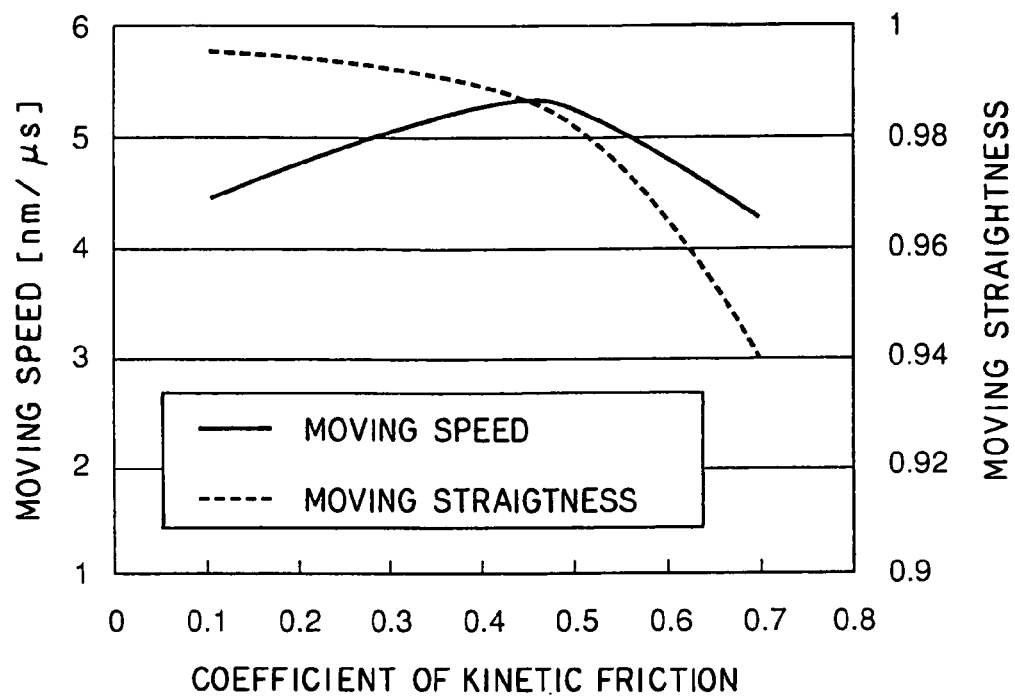
FIG. 8 is a grape for use in describing variations of a moving speed and moving straightness of a moving portion in dependency on differences in coefficients of kinetic friction between a vibration friction portion and the moving portion.

Referring to FIG. 8, the description will proceed to variations of a moving speed and moving straightness of the moving portion 423 in dependency on differences in coefficients of kinetic friction between vibration friction portion 443 and the moving portion 423. In FIG. 8, the abscissa represents a coefficient of kinetic friction, the right axis of the ordinate represents moving straightness, and the left axis of the ordinate represents a moving speed [nm/μs]. FIG. 8 shows simulation results under conditions that the ratio of ([the coefficient of static friction]/[the coefficient of kinetic friction]) is equal to 1 and a voltage applied with the electro-mechanical transducer (the laminated piezoelectric element) 441 has a vibration frequency of 60 kHz. In FIG. 8, a solid line represents the moving speed and a broken line represents the moving straightness.

From FIG. 8, it is seen that the moving speed is fast and the moving straightness gets better when the coefficient of kinetic friction lies in a range between 0.2 and 0.6, both inclusive.

Figure 9:
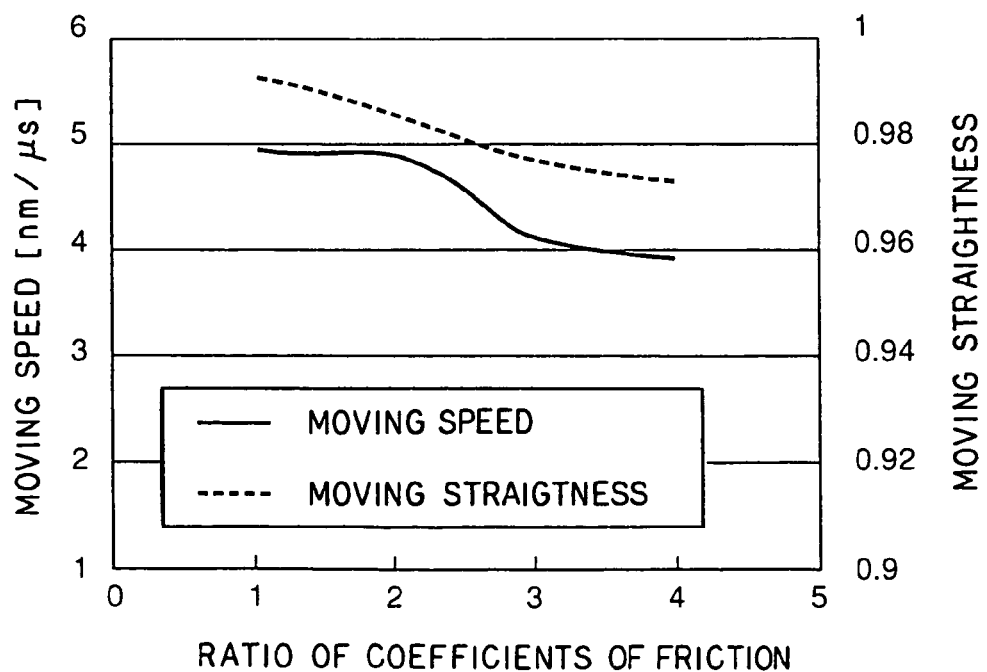
FIG. 9 is a graph for use in describing variations of a moving speed and moving straightness of the moving portion in dependency on differences in ratios of coefficients of friction ([a coefficient of static friction]/[a coefficient of kinetic friction]) between the vibration friction portion and the moving portion.

Referring to FIG. 9, the description will proceed variations of a moving speed and moving straightness of the moving portion 423 in dependency on differences in ratios of coefficients of friction ([the coefficient of static friction]/[the coefficient of kinetic friction]) between the vibration friction portion 443 and the moving portion 423. In FIG. 9, the abscissa represents a ratio of coefficients of friction, the right axis of the ordinate represents moving straightness, and the left axis of the ordinate represents a moving speed [nm/μs]. FIG. 9 shows simulation results under conditions that the coefficient of kinetic friction is equal to 0.3 and a voltage applied with the electro-mechanical transducer (the laminated piezoelectric element) 441 has a vibration frequency of 60 kHz. In FIG. 9, a solid line represents the moving speed and a broken line represents the moving straightness.

From FIG. 9, it is seen that the moving speed is fast and the moving straightness gets better when the ratio of [the coefficient of static friction]/[the coefficient of kinetic friction] lies in a range between 1 and 2.5, both inclusive.

From the above-description, with respect to the coefficient of friction in the frictionally coupled surface between the vibration friction portion 443 and the mobbing portion 423, it is possible to improve a moving efficiency of the moving portion 423 due to the vibration displacement of the vibration friction portion 443 that is generated by the electro-mechanical transducer (the laminated piezoelectric element) 4441, when the coefficient of kinetic friction lies in a range between 0.2 and 0.6, both inclusive and when the ratio of [the coefficient of static friction]/[the coefficient of kinetic friction] lies in a range between 1 and 2.5, both inclusive.

Although FIGS. 8 and 9 show the simulation results in a case where the material of the moving portion 423 is the fiber-reinforced resin composite and the material of the vibration friction portion 443 is aluminum, it may be understood by those of ordinary skill in the art that a similar effect is obtained when the moving portion 423 and the vibration friction portion 443 are made of other materials. This is because the coefficient of kinetic friction and the coefficient of static friction change (are defined) due to states (surface roughness, hardness and density of the material, and so on) of the contact surface (the frictionally coupled surface) between the moving portion 423 and the vibration friction portion 443 in the manner which is described above and they directly have no bearing on the materials in themselves.

In the exemplary aspect of this invention, the material of the vibration friction portion desirably may be a material which is enable to be manufactured by one selected from the group of consisting of metal casting, metal forging, and resin molding. It is preferably that the vibration friction portion may be made of the material selected from the group consisting of aluminum and magnesium and the moving portion may be made of the material which is one selected from the group of consisting of a fiber-reinforced resin composite, a fiber-reinforced metal composite, carbon, and stainless steel. It is desirable that the vibration friction portion may have a processed surface and the moving portion may have a smoothed surface. There are a coefficient of kinetic friction and a coefficient of static friction between the vibration friction portion and the moving portion. In this event, it is preferable that the coefficient of kinetic friction may lie a range between 0.2 and 0.6, both inclusive, and a ratio of the coefficient of static friction to the coefficient of kinetic friction may lie a range between 1 and 2.5, both inclusive.

An exemplary advantage according to the invention is that it is possible to transfer vibrations produced by an electro-mechanical transducer to a vibration friction portion with a high degree of efficiency. This is because the vibration friction portion is made of a material having a vibration transfer rate of 4900 meters/second or more and the moving portion is made of a material which has a vibration transfer rate 4900 meters/second or more and which is different from that of the vibration friction portion.

Another exemplary advantage according to the invention is that it is possible to improve moving efficiency of the moving portion due to the vibration displacements of the vibration friction portion that are produced by the electromechanical transducer. This is because the coefficient of kinetic friction lies in a range between 0.2 and 0.6, both inclusive, and a ratio of the coefficient of static friction to the coefficient of kinetic friction lying a range between 1 and 2.5, both inclusive.

While this invention has been particularly shown and described with reference to exemplary embodiments thereof, the invention is not limited to these embodiments. It will be understood by those of ordinary skill in the art that various changes in form and details may be therein without departing from the spirit and scope of the present invention as defined by the claims.

What is claimed is:

1. A driving device comprising:
   an electro-mechanical transducer having first and second end portions opposite to each other in an expansion/contraction direction;
   a stationary member coupled to the first end portion of said electro-mechanical transducer;
   a vibration friction portion coupled to the second end portion of said electro-mechanical transducer, said vibration friction portion being made of a material having a vibration transfer rate of 4900 meters/second or more; and
   a rod-shaped moving portion frictionally coupled to said vibration friction portion, said moving portion being movable in the expansion/contraction direction of said electro-mechanical transducer, said moving portion being made of a material which has a vibration transfer rate of 4900 meters/second or more and which is different from that of said vibration friction portion.

2. The driving device as claimed in claim 1, wherein the material of said vibration friction portion is a material which is enable to be manufactured by one selected from the group of consisting of metal casting, metal forging, and resin molding.

3. The driving device as claimed in claim 2, wherein said vibration friction portion is made of the material selected from the group consisting of aluminum and magnesium,
   wherein said moving portion is made of the material which is one selected from the group of consisting of a fiber-reinforced resin composite, a fiber-reinforced metal composite, carbon, and stainless steel.

4. The driving device as claimed in claim 3, wherein said vibration friction portion has a processed surface and said moving portion having a smoothed surface.

5. The driving device as claimed in claim 1, there are a coefficient of kinetic friction and a coefficient of static friction between said vibration friction portion and said moving portion, wherein the coefficient of kinetic friction lies in a range between 0.2 and 0.6, both inclusive, and a ratio of the coefficient of static friction to the coefficient of kinetic friction lying a range between 1 and 2.5, both inclusive.

6. A driving device comprising:
   an electro-mechanical transducer having first and second end portions opposite to each other in an expansion/contraction direction;
   a stationary member coupled to the first end portion of said electro-mechanical transducer;
   a vibration friction portion coupled to the second end portion of said electro-mechanical transducer; and
   a rod-shaped moving portion frictionally coupled to said vibration friction portion,
   said moving portion being movable in the expansion/contraction direction of said electro-mechanical transducer,
   wherein there are a coefficient of kinetic friction and a coefficient of static friction between said vibration friction portion and said moving portion,
   wherein the coefficient of kinetic friction lies in a range between 0.2 and 0.6, both inclusive, and a ratio of the coefficient of static friction to the coefficient of kinetic friction lying a range between 1 and 2.5, both inclusive.

* * * * *